United States Patent [19]

Arnaldo

[11] Patent Number: 4,991,413
[45] Date of Patent: Feb. 12, 1991

[54] ANTITHEFT DEVICE FOR ARTICLES HAVING AT LEAST AN ARM ELEMENT, IN PARTICULAR SPECTACLES

[76] Inventor: Mazzucchelli Arnaldo, via D. F. Lazzari 15, 24064 Grumello Del Monte, Bergamo, Italy

[21] Appl. No.: 497,101

[22] Filed: Mar. 21, 1990

[30] Foreign Application Priority Data

May 9, 1989 [IT]  Italy ................................ 20421 A/89

[51] Int. Cl.⁵ ............................................ E05B 73/00
[52] U.S. Cl. ........................................ 70/19; 70/58; 70/162; 351/158
[58] Field of Search ................ 70/57.1, 19, 57, 58, 70/14, 18, 63, 158–162; 292/DIG. 38; 81/318, 487; 351/158, 111

[56] References Cited

U.S. PATENT DOCUMENTS

| | | | |
|---|---|---|---|
| 530,456 | 12/1894 | Raymond | 70/19 |
| 1,495,883 | 5/1924 | Chadwick et al. | 70/19 |
| 3,390,938 | 7/1968 | Gansz | 351/111 |
| 3,999,409 | 12/1976 | Bell | 70/19 X |
| 4,462,317 | 7/1984 | Franko et al. | 70/63 X |
| 4,674,303 | 6/1987 | Salcone, II | 292/DIG. 38 X |

Primary Examiner—Lloyd A. Gall
Attorney, Agent, or Firm—Ladas & Parry

[57] ABSTRACT

The antitheft device (1) for articles having at least an arm element (2), in particular spectacles (3) comprises a pair of box-like bodies (4,5) which are pivoted to one another (at 6) adapted to clamp the arm element (2) therebetween. One of these bodies (5) is provided with an element 10, pivoted at (9) provided with a clawed lip (11), the other body (4) having a first window (12) therethrough the pivoted element can outward extend and a second window (12') therethrough the clawed lip (11) can inward extend, the device further comprising locking means (18) adapted to engage the clawed lip (11), as well as key means (14) operating on the locking means (18) so as to cause the clawed lip to be disengaged.

9 Claims, 2 Drawing Sheets

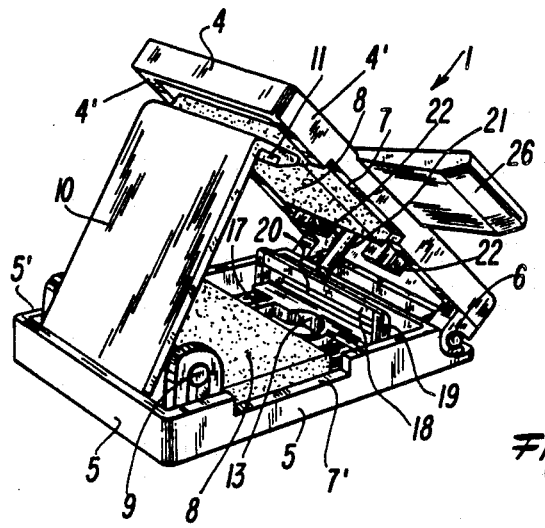
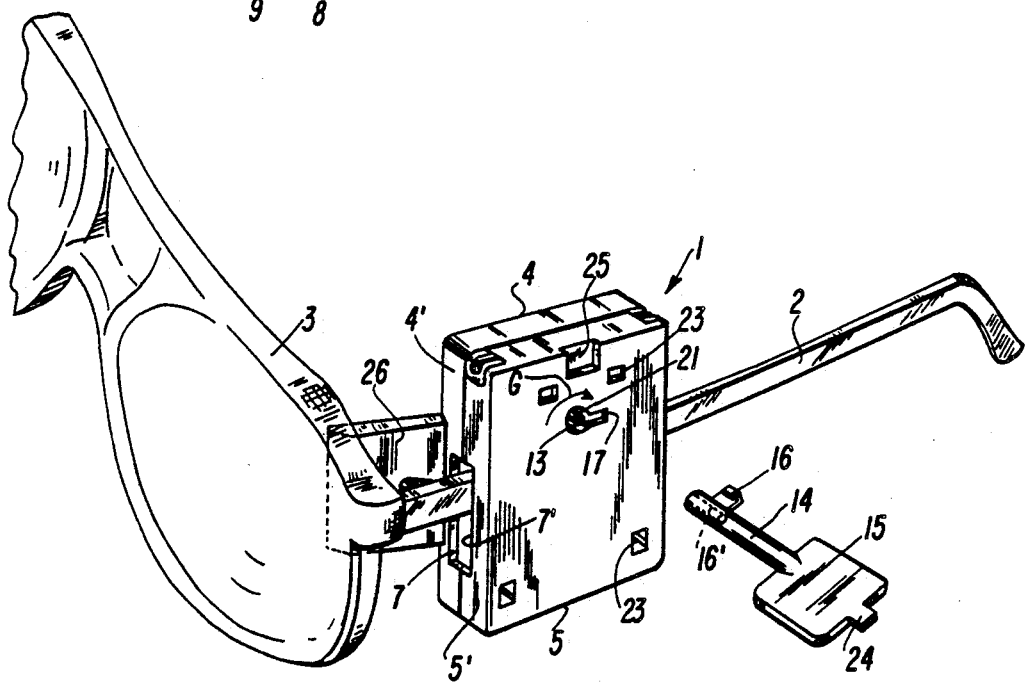

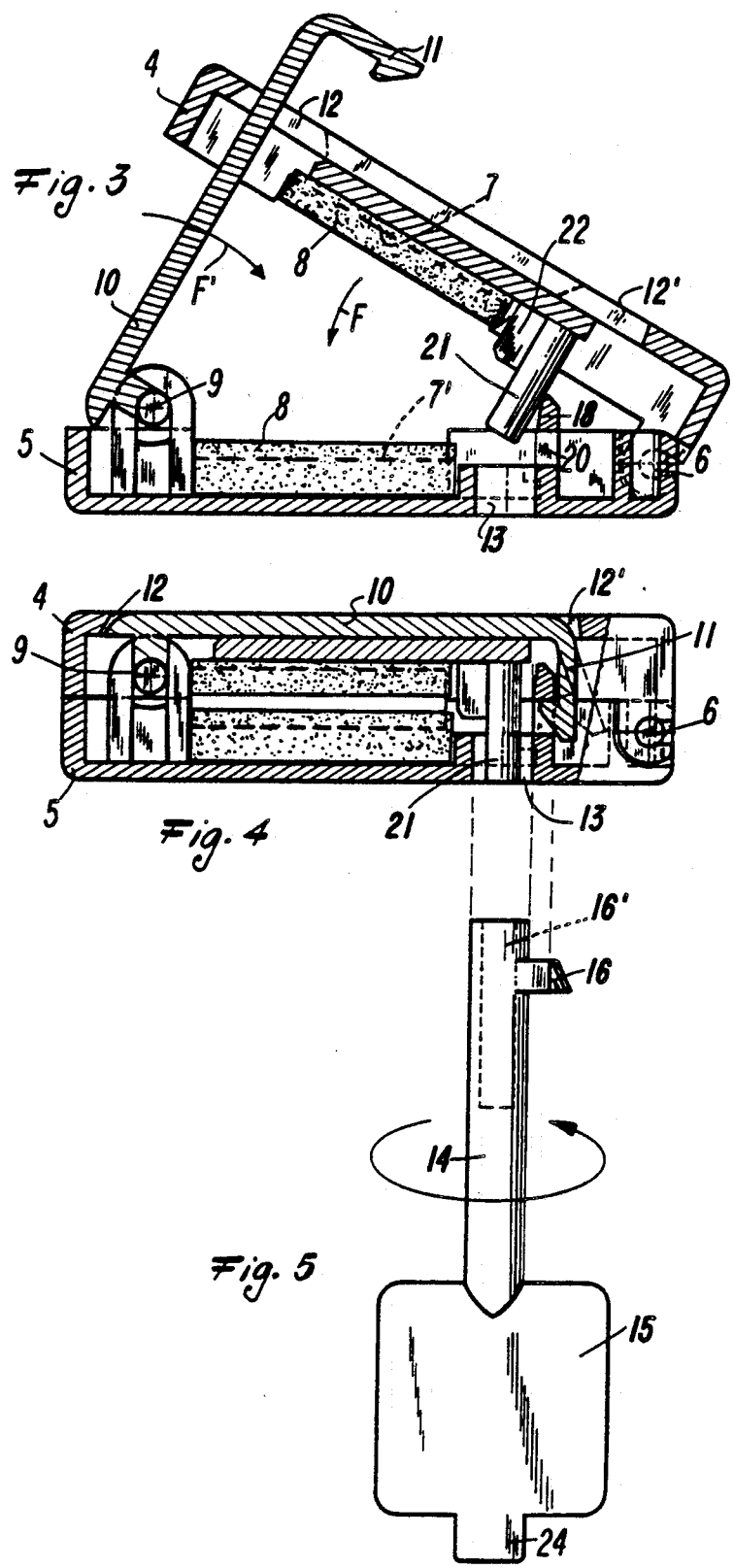

ANTITHEFT DEVICE FOR ARTICLES HAVING AT LEAST AN ARM ELEMENT, IN PARTICULAR SPECTACLES

BACKGROUND OF THE INVENTION

The present invention relates to an antitheft device for articles including at least an arm element, in particular spectacles.

As is known, in big stores goods are usually arranged on counters which can be freely accessed by the buyers in order to ascertain the articles quality and size, and for allowing for a clerk to perform all of the required operations, the selected articles being sent to a payment desk to be paid by the buyers.

Though such a buying system is rather practical, it has the drawback that ill intentioned persons can access the good exhibition tables and remove articles therefrom, such as spectacles which are put on so as to be not declared at the payment desk.

Spectacles antitheft devices are already known which comprise parts which must be removed by a payment clerk by systems which generally provide for breaking these antitheft devices, which negatively affects the buying cost.

The main object of the present invention is to provide such an antitheft device, in particular though not exclusively for spectacles, which is so designed and arranged as to be easily removed by a payment clerk, by means of simple key means and without any breaking or buckling of the antitheft device.

Another object of the invention is to provide such an antitheft device which allows for spectacles to be exhibited either in an open arm or closed arm condition.

These and yet other objects of the invention will become more apparent to those skilled in the art from the following disclosure.

The antitheft device for articles having at least an arm element, in particular spectacles, is essentially characterized in that said device comprises a pair of pivoted bodies adapted to clamp said arm element therebetween, means associated with said bodies for locking them at a closed condition, as well as key means for allowing for an authorized person to unlock said bodies.

The invention is illustrated, by way of an indicative but not limitative example, in the figures of the accompanying drawings, where:

BRIEF DESCRIPTION OF THE DRAWING

FIG. 1 is a perspective view of the device in its closed condition and associated with a spectacles pair;

FIG. 2 is a perspective view of the device in its open condition;

FIG. 3 is a schematic cross-sectional view of the device in its open condition and during a starting step for closing it;

FIG. 4 is a schematic cross-section longitudinal view of the closed device; and

FIG. 5 is a view of the key for opening or unlocking the device.

DESCRIPTION OF THE PREFERRED EMBODIMENT

With reference to the above mentioned figures, the device, indicated overally at the reference number 1, is shown in FIG. 1 applied on an arm member 2, for example pertaining to a spectacles pair 3.

The device 1, made of a plastic or the like material, comprises two box-like bodies 4, 5 which are mutually pivoted at 6, having on their opposite sides 4' and 5' bearing the hinge 6, facing slots 7, 7' adapted to allow for the arm member 2 to pass therethrough and thereat there are provided, inside said bodies 4 and 5, rubber bearing elements 8, the thickness of which can vary depending on that of the arm element 2.

On the body 5, in opposition to the hinge 6, there is provided a further hinge 9 for an element 10 provided with a clawed arm 11, whereas through the body 4 there are provided two small windows 12 and 12' spaced from one another by a distance substantially equal to the length of the element 10.

On the front face of the body 5 there is provided a keyhole 13 for a key 14 (FIG. 5) provided with a handle 15, an abutment 16 and an axial bore 16'. Inside said body 5, betweend the keyhole 13 and hinge 6, there is provided an elongated element 18 which is fixed to the inner face of the body 5 by means of two small feet 19, said element 18 defining through said inner face of the body 5 an elongated slot 20.

On the inner face of the body 4, near the bearing 8, there is provided a pin 21 adapted to be arranged, in the closed condition of the device (FIGS. 1 and 4) in line with the round hole of the keyhole 13 so as to engage in the hole 16' of the key 14 and properly guide said key.

On the two opposite sides of the pin 21 there are provided two barrier elements 22 the function of which will be disclosed hereinafter.

As shown in FIG. 1, for assemblying purposes the device is arranged, as it is in its open condition, (FIGS. 2, 3) on the arm element 2 so as to cause the latter to coincide with the slots 7, 7', the rubber bearings 8 having been proviously selected depending on the thickness of the arm element 2 (with a greater thickness as an arm 2 made of a metal material is used and with a smaller thickness as a plastic material arm 2 is used): during this step the element 10 is introduced into the window 12 (FIG. 3). Then the body 4 is turned (as shown by the arrow F in FIG. 3), so as to cause the pivoted element 10 to be lowered (as shown by the arrow F') so as to introduce its clawed lip 11 into the window 12' and so as to fixedly engage said clawed lip 11 in the slot 20 underlaying the element 18. The mutual arrangement of the parts 11 and 18 has been so selected that, as the element 10 is fully lowered, the arm element will be locked-clamped between the bearings 8 so as to prevent the device 1 from disengaging from said arm.

In order to open and remove the device 1, the payment clerk or cashier will introduce the key 14 into the keyhole 13, 17 and will turn it as shown by the arrow G (FIG. 1). In this way, the abutment portion 16 of the key will be introduced into the elongated slot 20, so as to engage with the clawed lip 11 and deflect said lip (FIG. 4), since it is made of a plastic material, thereby disengaging said lip from the elongated element 18, to cause the device 1 to be opened or released.

The barrier elements 22 will operate to prevent a small screwdriver, or the like tool, from being introduced into the slots 7, 7' by an ill-intentioned person, in replacement of the key 14.

On the outer face of the body 5 there are provided four openings 23 adapted to snap receive the pins of a label (not shown) for covering the keyhole 13 and bearing information relating to the article to which the device is applied, said label being adapted to be removed for introducting the key 14 into the keyhole 13, 17 by introducing a tab 24 provided on the key into a suitable notch 25 formed on the body 5 and operating it as a lever.

In the illustrated embodiment, the body 4 is provided with a lug 26 provided for bearing, as the device 1 is applied, on the lens of the spectacles 3 so as to prevent the arm 2 from closing in order to make more difficult a not authorized removal of the spectacles. In this connection it should be apparent that the lug 26 will be omitted as the arm 2 must not be held in an open condition.

The box-like shape of the two opposite bodies 4 and 5 affords the possibility of easily arranging inside the device 1 an electronic chip adapted to actuate an alarm as the article is moved through an electronic barrier without having removed the device 1.

What is claimed:

1. An antitheft device (1) for articles (3) having at least an arm element (2), said device comprising a pair of bodies mutually pivoted (at 6) adapted to clamp therebetween said arm element (2), means (10,11,18) associated with said bodies for locking said bodies in a closed condition, and key means (14) for allowing an authorized person to unlock said bodies characterized in that said associated with said bodies for locking said bodies in a closed condition comprise an element (10) pivoted (at 9) on one of said bodies (5) and provided with a clawed lip (11) and an elongated element (18) fixed to said one body (5), said clawed lip resiliently engages said elongated element in the closed condition of said bodies.

2. A device according to claim 1, characterized in that the other body (4) is provided with a first window (12) through which said pivoted element (10) can pass and a second window (12') through which said clawed lip (11) can pass in the closed condition of said two bodies.

3. A device according to claim 2, characterized in that said first window (12) is provided through said other body (4) on a side of said other body opposite to said hinge (9) of said pivoted element (10) and in that said second window (12') is formed through a side of said other body (4) adjacent to the hinge (6) of said two bodies.

4. A device, according to claim 1 characterized in that said pair of bodies (4,5) are provided with slots (7, 7') through which said arm element (2) can pass.

5. A device according to claim 4, characterized in that adjacent to said slots and inside said bodies there are arranged resilient material bearings (8) having a thickness depending on the thickness of said arm element.

6. A device according to claim 1 characterized in that said one body (5) provided with said elongated element (18) comprises a keyhole (13) for a key (14) provided with an abutment (16), said keyhole being arranged between a bearing (8) and said elongated element (18) and said abutment being arranged, as the key is arranged in said keyhole, at an elongated slot (20) underlaying said elongated element (18).

7. A device, according to claim 1, characterized in that said device comprises means (23,24,25) for applying on and removing from an outer face of either of said bodies an indicating label.

8. A device according to claim 1, characterized in that one of said bodies (4, 5) comprises a lug (26) adapted to abut on a lens of spectacles (3), in order to prevent said arm element from closing as said device is applied to said spectacles.

9. A device according to claim 1 characterized in that said device comprises barrier means (22) arranged inside one of said bodies (4) and adapted to prevent a key replacement tool from being introduced into said device.

* * * * *